United States Patent
Lairsey et al.

(10) Patent No.: US 11,270,459 B2
(45) Date of Patent: Mar. 8, 2022

(54) ENTERPRISE SYSTEM AUGMENTED REALITY DETECTION

(71) Applicant: Dell Products L.P., Round Rock, TX (US)

(72) Inventors: Jeffrey M. Lairsey, Round Rock, TX (US); Sudhir V. Shetty, Cedar Park, TX (US); Saurabh Kishore, Round Rock, TX (US); Alexander P. Rote, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/854,977

(22) Filed: Apr. 22, 2020

(65) Prior Publication Data

US 2021/0335005 A1 Oct. 28, 2021

(51) Int. Cl.
*G06T 7/571* (2017.01)
*G06T 7/73* (2017.01)

(52) U.S. Cl.
CPC ............... *G06T 7/74* (2017.01); *G06T 7/571* (2017.01); *G06T 2210/12* (2013.01)

(58) Field of Classification Search
None
See application file for complete search history.

(56) References Cited

U.S. PATENT DOCUMENTS

| | | | |
|---|---|---|---|
| 8,830,267 B2* | 9/2014 | Brackney | G06Q 10/06 345/633 |
| 2002/0067372 A1* | 6/2002 | Friedrich | G05B 19/41875 715/753 |
| 2012/0249588 A1* | 10/2012 | Tison | G06F 1/1696 345/633 |
| 2013/0031202 A1* | 1/2013 | Mick | G06F 3/00 709/217 |
| 2016/0171417 A1* | 6/2016 | Sankaralingham | G06F 1/163 705/7.42 |
| 2017/0186245 A1* | 6/2017 | Cloux | G06K 9/00214 |
| 2018/0137642 A1* | 5/2018 | Malisiewicz | G06N 3/0454 |
| 2019/0197786 A1* | 6/2019 | Molyneaux | G06T 15/08 |
| 2019/0219662 A1* | 7/2019 | Siessegger | G06T 7/74 |
| 2020/0252276 A1* | 8/2020 | Lairsey | G06T 19/006 |
| 2020/0410766 A1* | 12/2020 | Swaminathan | G06T 19/006 |
| 2021/0124944 A1* | 4/2021 | Datar | G08B 13/19613 |

* cited by examiner

*Primary Examiner* — Soo Shin

(74) *Attorney, Agent, or Firm* — Terrile, Cannatti & Chambers, LLP; Emmanuel A. Rivera

(57) ABSTRACT

A system, method, and computer-readable medium are disclosed for augmented reality detection of enterprise systems in a data center. An augmented reality view is captured of an enterprise system and objects of the enterprise system. Significant areas are detected of the enterprise. In the captured augmented reality view bounding boxes are added around the significant areas. Determination is performed of three-dimensional orientation of the significant areas. Depth of the signification areas is determined based on the three-dimensional orientation.

20 Claims, 4 Drawing Sheets

ENTERPRISE SYSTEM AUGMENTED REALITY DETECTION

BACKGROUND OF THE INVENTION

Field of the Invention

The present invention relates to information handling systems. More specifically, embodiments of the invention relate to augmented reality detection of enterprise systems in a data center environment.

Description of the Related Art

As the value and use of information continues to increase, individuals and businesses seek additional ways to process and store information. One option available to users is information handling systems. An information handling system generally processes, compiles, stores, or communicates information or data for business, personal, or other purposes thereby allowing users to take advantage of the value of the information. Variations in information handling systems allow for information handling systems to be general or configured for a specific user or specific use such as transaction processing, airline reservations, enterprise data storage, or global communications. In addition, information handling systems can include a variety of hardware and software components that can be configured to process, store, and communicate information and may include one or more computer systems, data storage systems, and networking systems. Further, information handling systems can be incorporated in a variety of environments, including, for example, desktop devices, mobile devices, and large data center configurations with hundreds-to-thousands of information handling systems in multiple environmentally controlled rooms.

In a data center environment where there can be thousands of information handling systems, managing and tracking such systems presents challenges to data center management. These challenges can include, for example, detecting, classifying, and locating hardware in the data center environment.

SUMMARY OF THE INVENTION

A system, method, and computer-readable medium are disclosed for augmented reality detection of enterprise systems in a data center. An augmented reality view is captured of an enterprise system and objects of the enterprise system. Significant areas are detected of the enterprise system. In the captured augmented reality view bounding boxes are added around the significant areas. Determination is performed of three-dimensional orientation of the significant areas. Depth of the signification areas is determined based on the three-dimensional orientation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for augmented reality detection of enterprise systems in a data center. In particular, enterprise systems and objects are detected in three-dimensional space in augmented reality, providing accurate detection of objects within augmented reality views and overlays. In certain implementations, detection in augmented reality environment is performed using physical image markers, received signal strength indicator (RSSI) measurements, and accelerometer data. Detection of the enterprise system and particularly objects of the enterprise system, is performed as to location, orientation, and depth.

For purposes of this disclosure, an information handling system includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
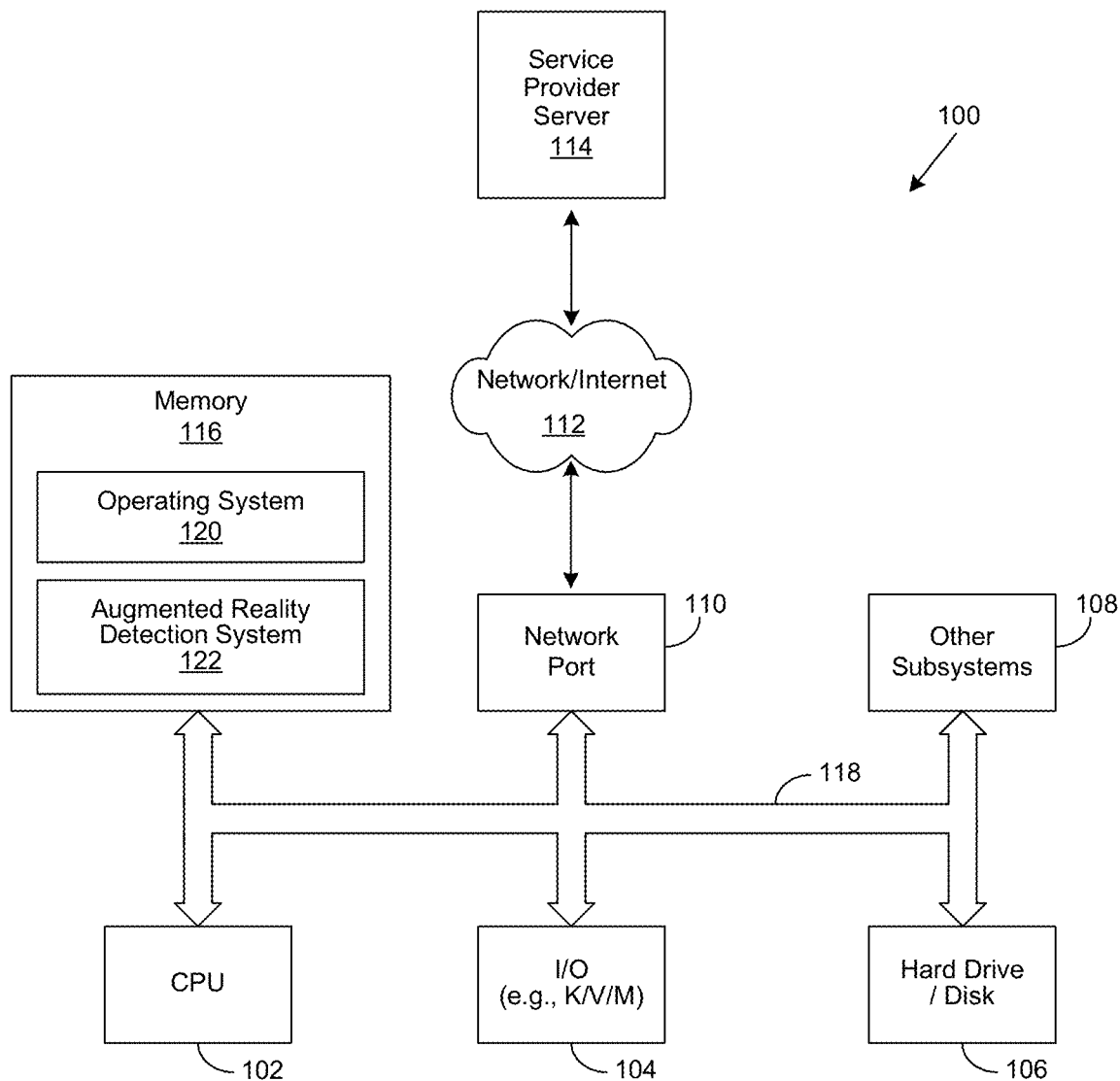
FIG. 1 is a generalized illustration of an information handling system that can be used to implement the system and method of the present invention.

FIG. 1 is a generalized illustration of an information handling system 100 that can be used to implement the system and method of the present invention. Information handling system 100 includes one or more processors (e.g., one or more processing cores or a central processor unit (CPU)) 102, input/output (I/O) devices 104, such as a display, a keyboard, a mouse, and associated controllers, a hard drive or disk storage 106, and various other subsystems 108. In various embodiments, information handling system 100 also includes one or more network ports 110 providing communication interfaces to networks external to the information handling system. One example of a network port includes a network interface card (e.g., Ethernet) operable to connect to a network 112, which is likewise accessible by a service provider server 114. The network 112 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

Information handling system 100 likewise includes system memory 120, which is interconnected to the foregoing via one or more buses 118. System memory 120 further comprises operating system 120 and in various embodiments includes an augmented reality detection system 122. In an embodiment, the information handling system 100 is able to download the data center management system 122 from the service provider server 114. In another embodiment, the augmented reality detection system 122 is provided as a service from the service provider server 114.

Augmented reality detection system 122 performs detection of enterprise systems and objects of the enterprise systems in a data center through augmented reality. Detection is performed as to location, orientation, and depth. Other processes are performed by augmented reality detection system 122, and the information handling system 100, as described herein.

Figure 2:
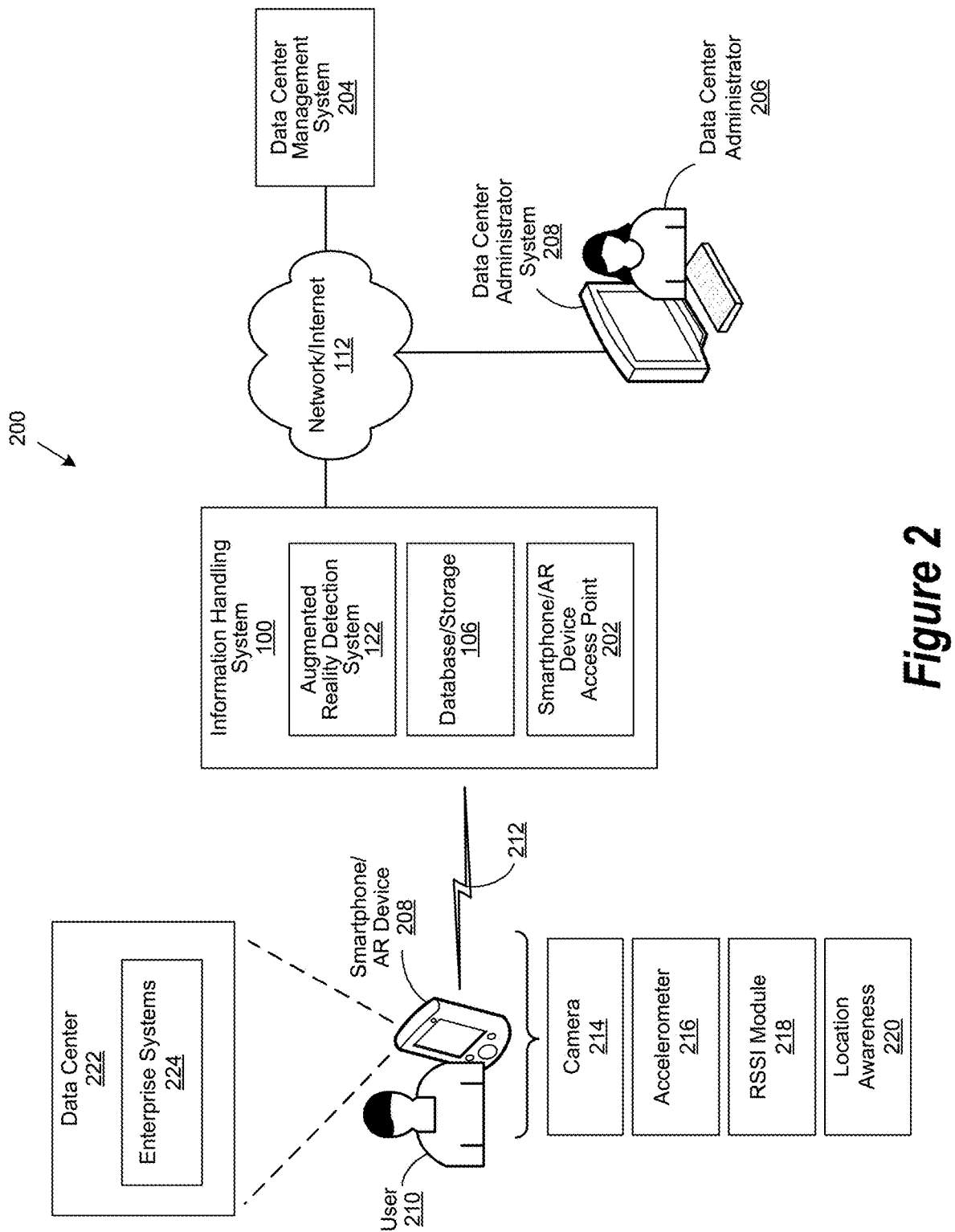
FIG. 2 is a simplified system diagram of an environment augmented reality detection of enterprise systems in a data center.

FIG. 2 shows an environment for augmented reality detection of enterprise systems in a data center. The environment 200 includes the information handling system 100 described in FIG. 1. As described above, the information handling system 100 includes augmented reality detection system 122 and hard drive/disk 106 also referred to as database/storage 106. In certain implementations, the information handling system 100 includes a smartphone/AR (augmented reality) device access point 202. The smartphone/AR device access point 202 provides for a connection access to a smartphone/AR device 204. Radio Frequency (RF) wireless connection 206 is maintained between the smartphone/AR device access point 202 and smartphone 204.

In certain embodiments, the information handling system 100 connects with a data center management system 208 through the network 112. The data center management system 208 can be a cloud hosted machine or a user deployed enterprise solution. The data center management system 208 can have information and data as to hardware and configuration of data centers and is used to manage configuration and inventory of data centers. In certain implementations, a data center administrator 210 through a data center administrator system 212 interacts with the data center management system 208.

In certain implementations, the smartphone/AR device 204 includes a camera 214, an accelerometer 216, an RSSI module 218 and location awareness component 220. Camera 214 can be implemented with lenses having particularly focal lengths. In certain implementations, determining focal point of camera 214 is used in augmented reality to determine physical size of an image, such as an object in an enterprise system. In certain implementations, the accelerometer 216 is used to generate accelerometer data to calculate three-dimensional orientation of an enterprise system and objects, relative to the camera view. In certain implementations, the RSSI module 218 is used to determine signal strength between smartphone/AR device 204 and the smartphone/AR device access point 202 of information handling system 100 and calculate a relative distance. The relative distance can be correlated to measurements of objects in the enterprise system. Implementations of the components of smartphone/AR device 204 are further described herein.

Camera 214 is configured to capture images of a data center 222, and particular enterprise systems 224 of the data center 222. In particular, camera 214 captures augmented reality images, including videos of enterprise systems 224 and objects, such as hardware that make up enterprise systems 224. Such augmented reality images are provided to the information handling system 100 and the augmented reality detection system 122.

In certain implementations, a user 226 identifies enterprise systems 224 of data center 222 and through smartphone/AR device 204 captures augmented reality images, including video, of objects in a specific enterprise system 224.

Figure 3:
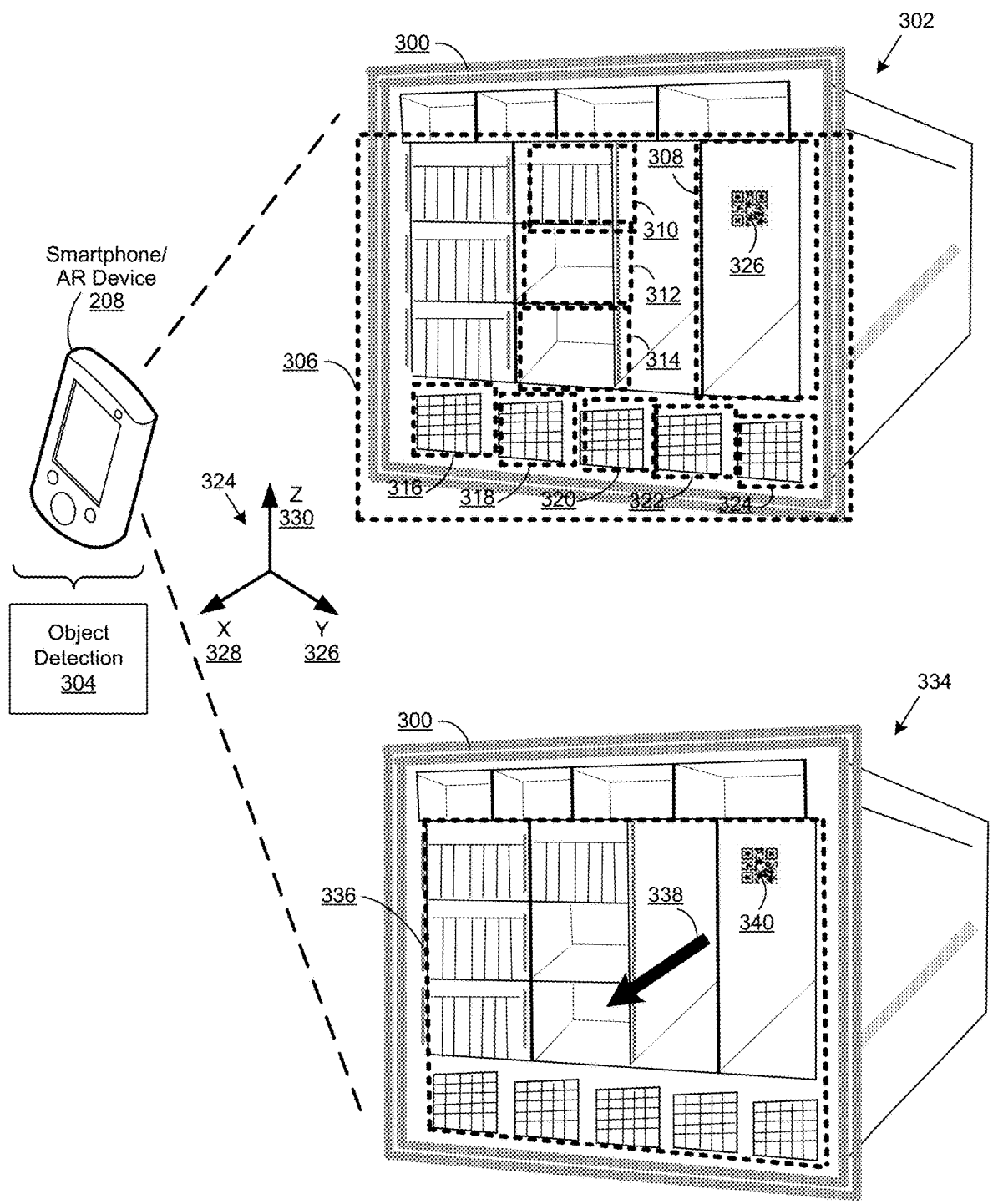
FIG. 3 is a simplified block diagram of a smartphone/device and captured images of an enterprise system in a data center.

FIG. 3 shows captured augmented reality images of an enterprise system in a data center. Augmented reality views and images of an enterprise system 300 are taken by smartphone/AR device 204. View 302 represents such an augmented reality view. In an implementation, user 226 holds up the smartphone/AR device 204 to the enterprise system 300, and an object detection model/application 304 creates bounding boxes around objects/systems of enterprise system 300 that are initially detected, as well as bounding boxes around significant areas of enterprise system 300 that help in determining a more accurate size and orientation. Such bounding boxes are represented by dotted boxes 306 to 324. In certain implementations, the object detection model/application 304 is unique to the enterprise system 300.

In certain implementations, physical image markers including AR stickers, machine trained components, modules, and/or markers, as represented by 326 are provided on areas of enterprise system 300. Such physical image makers can allow for communication of information as to enterprise system 300 by a visual input through smartphone/AR device 204 to augmented reality detection system 122. In certain implementations, such information can include a nonce implemented as part of cryptographic encrypted communication to the augmented reality detection system 122. The nonce and other information can be communicated over a blink pattern, LCD visual or any other dynamic visual pattern and incorporated into an encryption process. Furthermore, other information can include additional or specific information, such as predetermined knowledge, regarding dimensions of enterprise system 300.

Using the bounding boxes 306 to 324, any predetermined knowledge of the size of enterprise system 300 and identified significant area topology, along with accelerometer data gathered data, a three-dimensional orientation of the enterprise system 300 is calculated relative to the view 302. The three-dimensional orientation is represented in relation to a XYZ axis 326 that includes X axis plane 328, Y axis plane 330 and Z axis plane 322. Determination of the three dimensional orientation can be performed using one of several methods, including linear algebra, matrix transformation, etc. A view 324 can be created. With determination of the three-dimensional orientation, more accurate bounding boxes are determined as presented by bounding box 336.

Depth of an object in enterprise system 300 an be determined, once orientation is determined. In particular, distance of the object in augmented space is determined. In certain implementations, focal point of camera 214, along with determination of an object's physical size, distance is calculated and cross reference with RSSI values provided from RSSI module 218 to the augmented reality detection system 122. The depth calculation value is represented by arrow 338.

Figure 4:
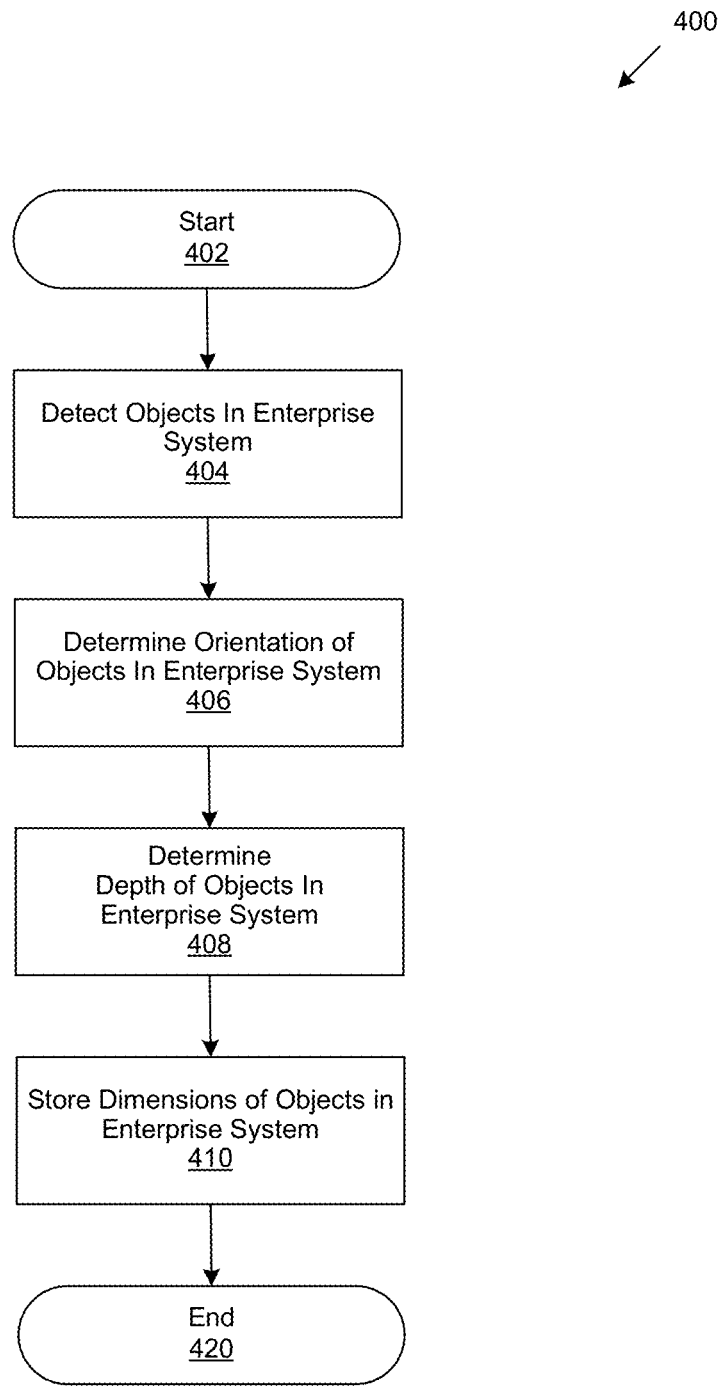
FIG. 4 is a simplified flow diagram illustrating an example process for environment augmented reality detection of enterprise systems in a data center.

FIG. 4 is a simplified flow diagram illustrating an example process for augmented reality detection of enterprise systems in a data center environment.

The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402 the process 400 starts. At block 404, object detection is performed on an enterprise system of a data center. The object detection can be performed using objection detection models on capture views taken by a smartphone or AR capture device, such as smartphone/AR device 204. Bounding boxes are created around a detected enterprise system and significant areas of the enterprise system. In certain implementations, physical image markers as describe herein can be used and provided as a visual input during the object detection.

At block 406, orientation of objects in the enterprise system is determined. Given the bounding boxes of the enterprise system and significant areas, along with any predetermined knowledge of the size of the enterprise system size and significant area topology and accelerometer data, three-dimensional orientation is calculated of the enterprise system relative to a camera view.

At block 408, depth of objects in the enterprise system is determined. Once an orientation of objects is determined, a more accurate measure of the object's dimensions within the camera view is calculated and used to determine the distance of the objects in augmented space. In certain implementations, using the camera's focal point as well as information as to physical size of the objects in the camera view, distances can be determined and cross-referenced with RSSI values.

As block 410, calculated dimensions are stored. The dimensions can be stored in an information handling system's database or storage, that is accessible by an augmented reality detection system 122.

As will be appreciated by one skilled in the art, aspects of the present invention may be embodied as a method, system, or computer program product. Accordingly, aspects may be implemented entirely in hardware, entirely in software (including firmware, resident software, micro-code, etc.) or in an embodiment combining software and hardware. These various embodiments may all generally be referred to herein as a "circuit," "module," or "system." Furthermore, embodiments may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of embodiments of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention are well adapted to attain the advantages mentioned as well as others inherent therein. While the present disclosure has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:
1. A computer-implementable method for augmented reality detection of enterprise systems in a data center, the method comprising:
  capturing a view of an enterprise system and objects of the enterprise system;

detecting structural areas of the enterprise system and the objects of the enterprise system;

adding bounding boxes to the view of the enterprise system representing the structural areas;

determining orientation in three-dimensional space of the structural areas;

determining depth of the structural areas based on the determined orientation in the three-dimensional space; and providing encrypted communication via a nonce to an augmented reality detection system of information as to view, the structural areas, the orientation in the three-dimensional space of the structural areas, and the depth of the structural areas.

2. The method of claim 1, wherein the capturing further comprises a visual capture of physical image markers on the enterprise system.

3. The method of claim 2, wherein the visual capture incudes additional information as to the enterprise system and/or the objects of the enterprise system.

4. The method of claim 1, wherein the detecting structural areas and adding bounding boxes is performed by an object detection model.

5. The method of claim 1, wherein the determining orientation further comprises refining the bounding boxes representing the structural areas.

6. The method of claim 1, wherein the determining orientation uses accelerometer data relative to the captured view.

7. The method of claim 1, wherein the depth of the structural areas is determined using focal point of a camera that captures the view and relative received signal strength indicator (RSSI) values to an access point.

8. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations for augmented reality detection of enterprise systems in a data center and comprising instructions executable by the processor and configured for:

capturing a view of an enterprise system and objects of the enterprise system;

detecting structural areas of the enterprise system and the objects of the enterprise system;

adding bounding boxes to the view of the enterprise system representing the structural areas;

determining orientation in three-dimensional space of the structural areas;

determining depth of the structural areas based on the determined orientation in the three-dimensional space; and providing encrypted communication via a nonce to an augmented reality detection system of information as to view, the structural areas, the orientation in the three-dimensional space of the structural areas, and the depth of the structural areas.

9. The system of claim 8, wherein the capturing further comprises a visual capture of physical image markers on the enterprise system.

10. The system of claim 9, wherein the visual capture incudes additional information as to the enterprise system and/or the objects of the enterprise system.

11. The system of claim 8, wherein the detecting structural areas and adding bounding boxes is performed by an object detection model.

12. The system of claim 8, wherein the determining orientation further comprises refining the bounding boxes representing the structural areas.

13. The system of claim 8, wherein the determining orientation uses accelerometer data relative to the captured view.

14. The system of claim 8, wherein the depth of the structural areas is determined using focal point of a camera that captures the view and relative received signal strength indicator (RSSI) values to an access point.

15. A non-transitory, computer-readable storage medium embodying computer program code, the computer program code comprising computer executable instructions configured for:

capturing a view of an enterprise system and objects of the enterprise system;

detecting significant areas of the enterprise system and the objects of the enterprise system;

adding bounding boxes to the view of the enterprise system representing the structural areas;

determining orientation in three-dimensional space of the structural areas;

determining depth of the structural areas based on the determined orientation in the three-dimensional space; and providing encrypted communication via a nonce to an augmented reality detection system of information as to view, the structural areas, the orientation in the three-dimensional space of the structural areas, and the depth of the structural areas.

16. The non-transitory, computer-readable storage medium of claim 15, wherein the capturing further comprises a visual capture of physical image markers on the enterprise system.

17. The non-transitory, computer-readable storage medium of claim 15, wherein the detecting structural areas and adding bounding boxes is performed by an object detection model.

18. The non-transitory, computer-readable storage medium of claim 15, wherein the determining orientation further comprises refining the bounding boxes representing the structural areas.

19. The non-transitory, computer-readable storage medium of claim 15, wherein the determining orientation uses accelerometer data relative to the captured view.

20. The non-transitory, computer-readable storage medium of claim 15, wherein the depth of the structural areas is determined using focal point of a camera that captures the view and relative received signal strength indicator (RSSI) values to an access point.

* * * * *